United States Patent
Phillips et al.

(10) Patent No.: US 6,181,715 B1
(45) Date of Patent: Jan. 30, 2001

(54) METHOD AND SYSTEM FOR PROVIDING EMULATED TELEPHONY OVER DSL

(75) Inventors: Bruce A. Phillips, Highlands Ranch; Darwei Kung; Richard H. Fink, both of Aurora, all of CO (US)

(73) Assignee: Qwest Communications International Inc., Denver, CO (US)

( * ) Notice: Under 35 U.S.C. 154(b), the term of this patent shall be extended for 0 days.

(21) Appl. No.: 09/321,044

(22) Filed: May 27, 1999

(51) Int. Cl.[7] ............................................. H04J 1/16
(52) U.S. Cl. ............................................. 370/493
(58) Field of Search ................................ 370/466, 468, 370/469, 485, 351, 352, 353, 400, 401, 402, 252, 493, 494, 495

(56) References Cited

U.S. PATENT DOCUMENTS

| | | | |
|---|---|---|---|
| 5,247,347 | * 9/1993 | Litteral et al. | 370/342 |
| 5,787,079 | * 7/1998 | Bateman et al. | 370/493 |
| 5,949,763 | * 9/1999 | Lund | 370/261 |
| 5,982,784 | * 11/1999 | Bell | 370/485 |
| 5,991,309 | * 7/1998 | Jensen et al. | 370/494 |
| 6,005,873 | * 12/1999 | Amit | 370/494 |
| 6,028,867 | * 2/2000 | Rawson et al. | 370/463 |
| 6,061,357 | * 5/2000 | Olshansky et al. | 370/401 |
| 6,061,392 | * 5/2000 | Bremer et al. | 370/468 |
| 6,069,879 | * 5/2000 | Chatter | 370/295 |

\* cited by examiner

*Primary Examiner*—Melvin Marcelo
*Assistant Examiner*—Phuongchau Ba Nguyen
(74) *Attorney, Agent, or Firm*—Brooks & Kushman P.C.

(57) ABSTRACT

A method and system for providing telephony services utilizes an emulated telephony channel within an allocated portion of digital subscriber line bandwidth. The digital subscriber line connects to a packet switched network, and embodiments of the present invention derive telephony services over the digital subscriber line by utilizing a portion of the available bandwidth to emulate one or more telephony channels.

20 Claims, 2 Drawing Sheets

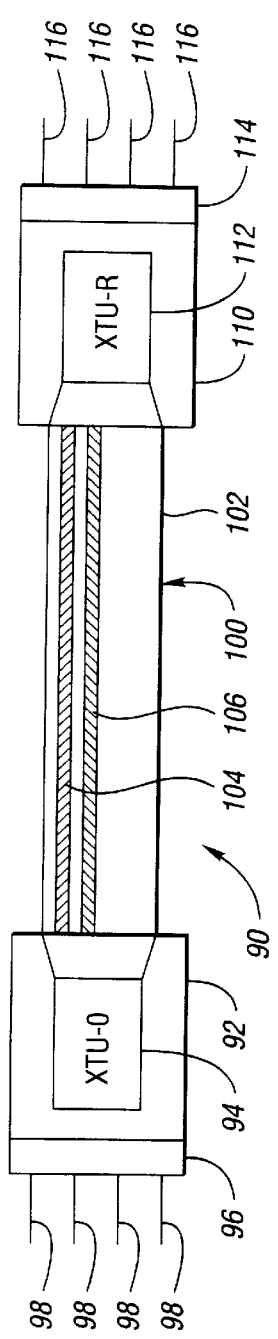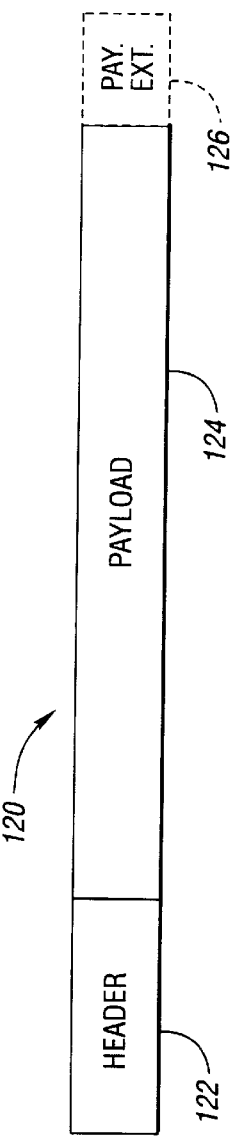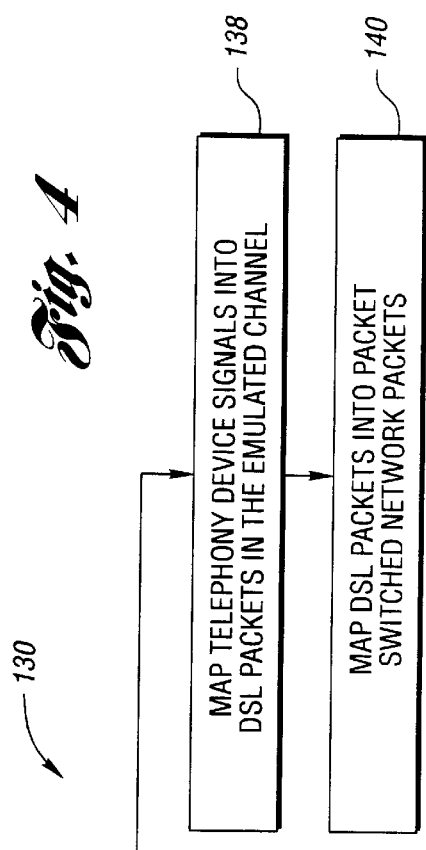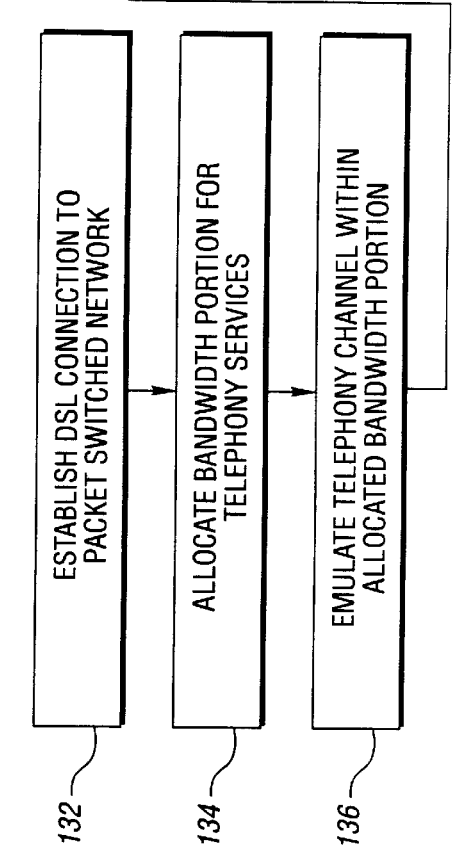

METHOD AND SYSTEM FOR PROVIDING EMULATED TELEPHONY OVER DSL

FIELD

The present invention relates to methods and systems for providing telephony services.

BACKGROUND ART

Telephony services that are available today stem from the existing wireline intelligent network. The primary elements of the intelligent network are a switching system, a signaling network, a centralized database, and an operations support system which supports the database. In general, the switching system intercepts a call from a call source, and suspends call processing while launching a query through the signaling network to the centralized database. The database, in turn, retrieves the necessary information to handle the call, and returns that information through the signaling network to the network switch, which may be a local digital switch, so that the call can be completed. The operations support system administers the appropriate network and customer information.

The intelligence of the intelligent network is found at the service control points. A service control point is a transaction-processing database which provides call-handling information in response to network queries. The signaling network is made up of signal transfer points. A signal transfer point is a packet switch found in the common-channel signaling network. The signal transfer point is used to route signaling messages between network access nodes, such as switches and service control points. Signaling system 7 is a common communications protocol used in common-channel signaling networks.

An end user gains access to the wireline network via a twisted pair that generally runs from the local switch to the end user residence. Typically, the intelligent network is accessible by the end user as part of the Public Switched Telephone Network (PSTN). The twisted pair running from the central office to the residence is a standard telephone line, and communicates over the low frequency band associated with normal, plain old telephone systems (POTS). Also, existing telephony equipment for use at the end user residence is typically low power, and can be powered by the twisted pair. That is, in the event of a local power outage, an end user does not lose telephony services because the telephony device draws power from the telephone network. In addition to voice calls, existing telephone networks may also be used for modem applications to provide data services in the traditional plain old telephone system (POTS) bandwidth.

Recently, it has become desirable for many end users including home users, and office users, to obtain higher bandwidth data connections for access to data networks such as the Internet. These high speed network connections generally provide a much higher data bit rate than does the traditional arrangement with a modem connected to the plain old telephone system (POTS) physical drop.

The number of available voice and data services over different types of networks is now rapidly increasing. Unfortunately, rapid changes in technology sometimes limit the availability to the end user of the opportunity to expand services in a cost effective manner. That is, added services often require new hardware and sometimes even a new physical drop to be run to the residence.

For the foregoing reasons, there is a need to expand telephony services in a cost effective manner while utilizing the rapidly advancing technologies in networking.

DISCLOSURE OF INVENTION

It is, therefore, an object of the present invention to provide a method and system for providing telephony services by emulating a telephony channel within an allocated portion of the bandwidth of a digital subscriber line (DSL).

In carrying out the above object, a method for providing telephony services is provided. The method comprises establishing a digital subscriber line connection to a packet switched network. The digital subscriber line connection has a bandwidth. The method further comprises allocating a portion of the bandwidth for telephony services, and emulating a telephony channel within the allocated portion of the digital subscriber line bandwidth.

In a preferred embodiment, the emulated telephony channel is adapted to function with the existing packet switched network. That is, the digital subscriber line supports a first packet format, while the packet switched network supports a second packet format. The digital subscriber line preferably is connected to the packet switched network through an adaption layer. The method preferably further comprises mapping digital subscriber line packets passing through the adaption layer into packet switched network packets.

Further, in a preferred embodiment, the digital subscriber line is connected to a telephony device through a remote adaption layer. The method preferably further comprises mapping signals from the telephony device passing through the remote adaption layer into digital subscriber line packets. Advantageously, appropriate adaption layers allow embodiments of the present invention to be utilized with existing telephony devices and with an existing packet switched network such as an asynchronous transfer mode (ATM) network or an Internet protocol (IP) network.

Preferably, the digital subscriber line supports a packet having a header and a payload. Further, in a preferred embodiment, either information in the header or information in the payload is utilized to indicate a packet residing on the emulated telephony channel. That is, packets residing on the emulated telephony channel are distinguished from other packets riding over the remaining bandwidth of the digital subscriber line, such as video or data packets.

Presently, it is preferred that the allocating of the bandwidth portion is a substantially permanent allocation for telephony services. Of course, it may be possible to provide temporary allocation of the bandwidth portion for telephony services upon demand by an end user. Further, it is preferred that the telephony channel includes at least one 64,000 bits per second telephony channel that is emulated within the allocated portion of the digital subscriber line bandwidth. Of course, any number of telephony channels may be emulated within the allocated bandwidth portion, as required by the end user.

Further, in carrying out the present invention, a system for providing telephony services is provided. The system comprises a digital subscriber line, a server terminal, and a remote terminal. The digital subscriber line has a bandwidth with a portion allocated for telephony services. The server terminal connects the digital subscriber line to a packet switched network. The remote terminal is connected to the digital subscriber line. The server terminal and the remote terminal are configured to emulate a telephony channel within the allocated portion of the digital subscriber line bandwidth.

Preferably, the system further comprises an adaption layer configured to map digital subscriber line packets passing through the adaption layer into packet switched network packets. That is, the packet switched network and the digital subscriber line may support different types of packets, which is reconciled by the adaption layer at the server terminal. Further, preferably, the system further comprises a telephony device connected to the remote terminal, and a remote adaption layer. The remote adaption layer is configured to map signals from the telephony device passing through the remote adaption layer into digital subscriber line packets. That is, the remote adaption layer allows traditional telephony devices to utilize the emulated telephony channel.

Preferably, packets residing on the emulated telephony channel are indicated by packet header or packet payload information. If desired, the payload may be extended to hold such information, and then the server terminal adaption layer may be configured to map the packets onto the packet switched network, such as an asynchronous transfer mode (ATM) network, or an Internet protocol (IP) network.

The advantages associated with embodiments of the present invention are numerous. For example, methods and systems of the present invention provide telephony services over an emulated telephony channel over a digital subscriber line. Preferably, a very high bit rate digital subscriber line (VDSL) subscriber line is utilized to provide the emulated telephony channel. That is, the present invention derives telephony from VDSL to allow any number of telephony channels to be provided within an allocated bandwidth portion, provided that the allocated bandwidth portion big enough. As such, telephony in addition to video and data may be provided over VDSL, with the server terminal adaption layer providing timing, bandwidth and service management, including flow control mechanisms to connect the telephony, video, and data services to the packet switched network.

The above object and other objects, features, and advantages of the present invention are readily apparent from the following detailed description of the best mode for carrying out the invention when taken in connection with the accompanying drawings.

BRIEF DESCRIPTION OF DRAWINGS

FIG. 2 illustrates a digital subscriber line, server terminal, and remote terminal (also referred to as residential gateway), showing two emulated telephony channels within the DSL bandwidth;

FIG. 3 is an exemplary cell for embodiments utilizing cell type packets, wherein an indication that a packet resides on the emulated telephony channel may be located within the header or within the payload extension; and FIG. 4 is a block diagram illustrating a method of the present invention for providing telephony services with an emulated telephony channel from a digital subscriber line.

BEST MODE FOR CARRYING OUT THE INVENTION

Figure 1:
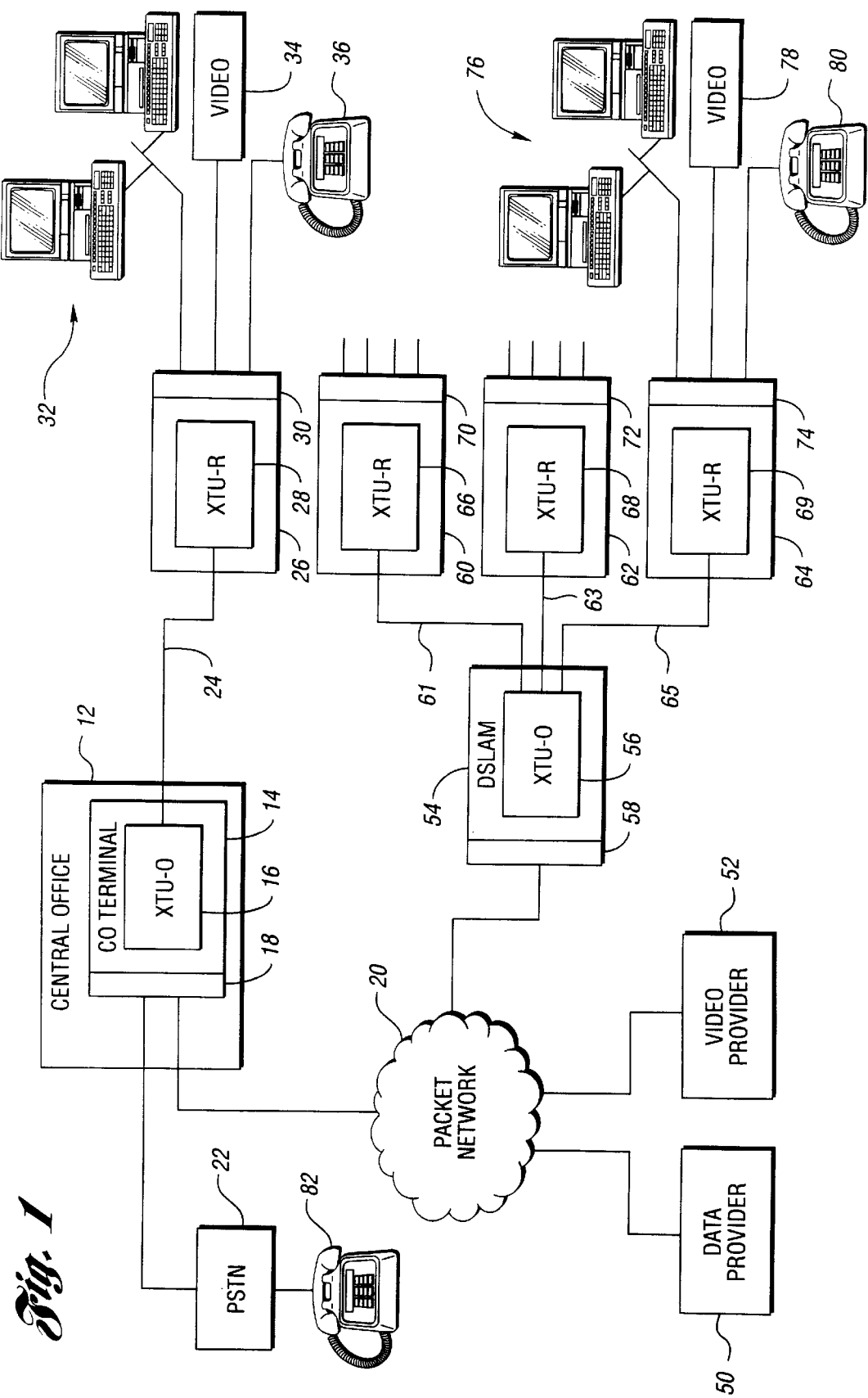
FIG. 1 is a system of the present invention for providing emulated telephony channels over an allocated bandwidth portion of a digital subscriber line.

Referring to FIG. 1, a system of the present invention is generally indicated at 10. System 10, as shown, includes a central office 12. Central office 12 includes a central office terminal 14. A transmission unit 16, shown as an optical transmission unit, is located within central office terminal 14. Further, central office terminal 14 includes an adaption layer 18. Adaption layer 18 provides timing, bandwidth and service management, and flow control mechanisms to adapt the digital subscriber line (DSL) services into packets for packet network 20.

Packet network 20 may take many forms including an asynchronous transfer mode (ATM) network or an Internet protocol (IP) network. Preferably, packet network 20 is an ATM network, which is a cell type packet network. As such, adaption layer 18 adapts the digital subscriber line packets into ATM streams.

If desired, it is contemplated that adaption layer 18 could map telephony services to the public switch telephone network (PSTN) 22. In order for data to get to adaption layer 18, transmission unit 16 receives data over digital subscriber line 24, which is preferably implemented as a very high bit rate digital subscriber line (VDSL). Digital subscriber line 24 connects central office terminal 14 to a remote terminal 26. Remote terminal 26 includes a remote transmission unit 28 and has an adaption layer 30. Adaption layer 30 functions to adapt the digital subscriber line 24 to, for example, a computer network 32, video devices 34, and in accordance with the present invention to telephony device 36.

That is, adaption layer 30 adapts data from computer network 32, video devices 34, and telephony device 36 to be sent over digital subscriber line 24 to central office terminal 14. The server terminal, shown as the central office terminal 14, and the remote terminal 26 are configured to emulate a telephony channel within an allocated portion of the bandwidth of digital subscriber line 24. Transmission unit 28 uses a modulation scheme to modulate the different signals including telephony signals onto digital subscriber line 24. For example, time division multiplexing (TDM) may be used to multiplex the emulated telephony channel onto the available digital subscriber line bandwidth. That is, in a preferred implementation, the emulated telephony channel or channels are given discrete portions of time during which the telephony device or devices may use the available bandwidth of the digital subscriber line. Of course, it is to be appreciated by those skilled in the art that time division multiplexing is one modulation scheme, and other modulation schemes may be suitable depending on the application. For example, frequency division multiplexing or frequency division multiplexing in combination with time division multiplexing may be appropriate for implementations of the present invention to emulate telephony channels over a digital subscriber line.

It is to be appreciated that adaption layers 30 and 18 function to map signals from telephony device 36 passing through remote adaption layer 13 and to digital subscriber line 24 and then to map digital subscriber line packets passing through adaption layer 18 into packet switched network packets destined for packet network 20. Advantageously, this allows the digital subscriber line 24 to employ a modified packet format while adapting to the packet network and the devices at the residence. The modified packet type may be modified so that packets residing on the emulated telephony channel may be indicated by information on either the packet header or the packet payload, possibly in a packet payload extension. Of course, although cell type packets are preferred for the digital subscriber line and the packet network, non-fixed packets may be used in the alternative.

With continuing reference to FIG. 1, packet network 20 has connections to a data provider 50 and a video provider 52. As such, digital subscriber line 24 may perform the traditional functions of providing data and video service to computers 32 and video devices 34, while providing emulated telephony channels to one or more telephony devices 36. Further, packet network 20 is shown connected to a digital subscriber line access multiplexer (DSLAM) 54.

DSLAM 54 performs essentially the same functions as central office terminal 14, but is not located within a central office. That is, the term "server terminal" as used herein may be construed as a central office terminal or may be construed as a DSLAM or as any other device having equivalent functionality. DSLAM 54 includes a transmission unit 56, shown as an optical transmission unit, and further includes an adaption layer 58. DSLAM 54 serves a plurality of remote terminals 60, 62, 64 with a corresponding plurality of digital subscriber lines 61, 63, 65, respectively. Of course, although central office terminal 14 was shown serving a single remote terminal 26, it is appreciated that similar to DSLAM 54, central office terminal 14 may serve any number of remote terminals. Remote terminal 60, 62, 64 each include a transmission unit 66, 68, 70, respectively. Further, each remote terminal 60, 62, 64 includes an adaption layer 70, 72, 74, respectively.

For convenience, devices connected to remote terminals 60 and 62 are not shown, and only remote terminal 64 is illustrated as connected to end user devices. Further, the end user devices shown in FIG. 1 are exemplary, and others may be contemplated.

Remote terminal 64 is shown connected to computer network 76, video devices 68, and telephony device 80. In accordance with the present invention, a call originating at telephony device 36 may ride over an emulated telephony channel on digital subscriber line 24 and be routed to packet network 20, with adaption layers 30 and 18 properly adapting signals from telephony device 36 to digital subscriber line 24 and to packet network 20. At packet network 20, packets originating from telephony device 36 may be routed to DSLAM 54 and then to, for example, telephony device 80. As such, a call may ride over an emulated telephony channel at both the call source and the call destination end.

Further, it is to be appreciated that services provided on the emulated telephony channel may include voice telephony and/or data telephony. That is, any telephony devices that may traditionally be connected to a plain old telephone system (POTS) drop at a customer residence, may in accordance with the present invention, be connected to a remote terminal to utilize an emulated telephony channel. Accordingly, it is preferred that the emulated telephony channel is a 64,000 bits per second telephony channel. Still further, it is presently preferred by the inventors that the allocated bandwidth portion of the digital subscriber line available bandwidth is substantially permanently allocated for telephony services.

By substantially permanently, it is meant that channel allocation is not dynamic or on-demand, and that the presence or absence of an emulated channel is predetermined and not based on calling demand. On the other hand, it may be contemplated to dynamically allocate the emulated telephony channel, on demand by a user. It is preferred that the channel is permanently available so that calls destined for a telephony device connected to an emulated telephony channel may reach the telephony device without excessive latency that may occur while waiting for a channel request to be granted.

Of course, it is to be appreciated that embodiments of the present invention are not limited to calls that both originate and terminate over emulated telephony channels. That is, either telephony device 36 or telephony device 80 may place a call that upon reaching central office 12, the call may be routed over PSTN 22 to a traditional telephony device 82 on a plain old telephone system (POTS) extension. Further, a call originating from the PSTN may be routed to an emulated telephony channel.

With reference to FIG. 2, emulated telephony channels are graphically illustrated, and the DSL connection between two terminals is generally indicated at 90. Server terminal 92, which may be located within a central office or may be a DSLAM, includes a transmission unit 94, shown as an optical transmission unit. Server terminal 92 further includes an adaption layer 96. Adaption layer 96 maps digital subscriber line packets passing through the adaption layer into packet switched network packets on outgoing connections 98 which connect to the packet switched network. Alternatively, adaption layer 96 may be configured to map digital subscriber line packets on to the public switched telephone network (PSTN).

The digital subscriber line is generally indicated at 100. Graphically, the data and video portion of the DSL bandwidth is indicated at 102, while first and second emulated telephony channels have allocated bandwidth as indicated at 104 and 106, respectively. Of course, it is to be appreciated that preferred embodiments of the present invention utilize time division multiplexing, and that the graphical illustration shown in FIG. 2 is for convenience and does not require any specific type of multiplexing. As such, time division multiplexing, frequency division multiplexing, combinations of different types of multiplexing, and so on, may all be used depending on the application, as needed.

The remote terminal 110 includes a transmission unit 112, and also includes an adaption layer 114. Adaption layer 114 adapts the digital subscriber line packets by mapping signals from telephony devices attached to inputs 116 into digital subscriber line packets. That is, adaption layer 114 allows traditional telephony devices to take advantage of the benefits of embodiments of the present invention by adapting the devices to the digital subscriber line packets and then adapting the digital subscriber line packets at layer 96 to the packet network.

Referring to FIG. 3, an exemplary cell type packet for use over the digital subscriber line is illustrated. Of course, different types of packets may be utilized over the digital subscriber line as is appreciated by one of ordinary skill in the art, and the cell type packet illustrated is exemplary and is not meant to be limiting. Packet 120 includes a header 122 and a payload 124. Preferably, header 122 and payload 124 form the same packet that exists over the packet switched network, such as the asynchronous transfer mode (ATM) network. Then, it is preferred that packet 120 is modified for use over the digital subscriber line. That is, a packet residing on the emulated telephony channel may employ information in header 122 that indicates that the packet belongs on the emulated telephony channel. In the alternative, information on payload 124 may be utilized to indicate that the packet belongs in the emulated telephony channel. As such, including information within the packet header or the packet payload indicates that the packet rides on the emulated telephony channel most likely modifies the cell structure so that adaption layer 96 is required to map DSL packets onto the network. In the alternative, a payload extension 126 may be employed to carry information indicating that a packet resides on the emulated telephony channel.

With reference to FIG. 4, a method of the present invention is illustrated. At block 132, a digital subscriber line connection to a packet switched network is established. The digital subscriber line connection has a bandwidth, which may be asymmetric or symmetric. At block 134, a portion of the DSL bandwidth is allocated for telephony services. Preferably, this is a permanent allocation. At block 136, a telephony channel is emulated within the allocated portion of the digital subscriber line bandwidth. Preferably, DSL packets include information in the header or the payload (possibly in a payload extension) that indicates when a packet resides on the emulated telephony channel.

Further, is preferred that time division multiplexing (TDM) is utilized to provide the bandwidth for the emulated telephony channel. At block 138, signals from one or more telephony devices are mapped into digital subscriber line packets in the emulated telephony channel. This mapping is performed by the adaption layer 114 at the remote terminal (FIG. 2). Adaption layer 115 also maps packets to the DSL bandwidth that do not fall in the emulated telephony channel. At block 140, digital subscriber line packets are mapped into packet switched network packets. This mapping is performed by adaption layer 96 of the server terminal (FIG. 2).

Of course, the server terminal may be located within a central office, or may be a digital subscriber line access multiplexer (DSLAM). It is to be appreciated by those skilled in the art that embodiments of the present invention derive telephony from a digital subscriber line such as, for example, VDSL. Further, it is to be appreciated that the appropriate adaption layers provide, as needed, a modified cell structure to reduce potential latency issues and to use coding in either the cell header or payload to designate telephony packets. Embodiments of the present invention are very useful in that, as needed by an end user, additional telephony lines may be provided without requiring the need to physically wire a drop from the local switch to the residence.

What is claimed is:

1. A method for providing telephony services, the method comprising:
   establishing a digital subscriber line connection to a packet switched network, the digital subscriber line connection having a bandwidth;
   allocating a portion of the bandwidth non-baseband multiplexed for telephony services emulation; and
   emulating a telephony channel within the allocated portion of the digital subscriber line bandwidth.

2. The method of claim 1 wherein the digital subscriber line supports a first packet format, the packet switched network supports a second packet format, and the digital subscriber line is connected to the packet switched network through an adaption layer, and wherein the method further comprises:
   mapping digital subscriber line packets passing through the adaption layer into packet switched network packets.

3. The method of claim 2 wherein the digital subscriber line is connected to a telephony device through a remote adaption layer, and wherein the method further comprises:
   mapping signals from the telephony device passing through the remote adaption layer into digital subscriber line packets.

4. The method of claim 1 wherein allocating further comprises:
   substantially permanently allocating the portion of the bandwidth for telephony services.

5. The method of claim 1 wherein allocating further comprises:
   upon demand by an end user, temporarily allocating the portion of bandwidth for telephony services.

6. The method of claim 1 wherein emulating further comprises:
   emulating at least one 64,000 bits per second telephony channel within the allocated portion of the digital subscriber line bandwidth.

7. The method of claim 1 wherein the telephony services include voice telephony.

8. The method of claim 1 wherein the telephony services include data telephony.

9. The method of claim 1 wherein the digital subscriber line supports a packet having a header and a payload, and wherein information in the header is utilized to indicate a packet residing on the emulated telephony channel.

10. The method of claim 1 wherein the digital subscriber line supports a packet having a header and a payload, and wherein information in the payload is utilized to indicate a packet residing on the emulated telephony channel.

11. A system for providing telephony services, the system comprising:
    a digital subscriber line having a bandwidth with a portion allocated for non-baseband multiplexed telephony services emulation;
    a server terminal connecting the digital subscriber line to a packet switched network; and
    a remote terminal connected to the digital subscriber line, wherein the server terminal and the remote terminal are configured to emulate a telephony channel within the allocated portion of the digital subscriber line bandwidth.

12. The system of claim 11 wherein the digital subscriber line supports a first packet format and the packet switched network supports a second packet format, wherein the server terminal further comprises:
    an adaption layer configured to map digital subscriber line packets passing through the adaption layer into packet switched network packets.

13. The system of claim 12 further comprising:
    a telephony device connected to the remote terminal; and
    a remote adaption layer configured to map signals from the telephony device passing through the remote adaption layer into digital subscriber line packets.

14. The system of claim 11 wherein the allocated bandwidth portion is substantially permanently allocated for telephony services.

15. The system of claim 11 wherein the allocated bandwidth portion is, upon demand by an end user, is temporarily allocated for telephony services.

16. The system of claim 11 wherein the emulated telephony channel is a 64,000 bits per second telephony channel.

17. The system of claim 11 wherein the telephony services include voice telephony.

18. The system of claim 11 wherein the telephony services include data telephony.

19. The system of claim 11 wherein the digital subscriber line supports a packet having a header and a payload, and wherein information in the header is utilized by the server terminal and the remote terminal to indicate a packet residing on the emulated telephony channel.

20. The system of claim 11 wherein the digital subscriber line supports a packet having a header and a payload, and wherein information in the payload is utilized by the server terminal and the remote terminal to indicate a packet residing on the emulated telephony channel.

* * * * *